June 21, 1949.　　　　J. W. DAWSON　　　　2,473,575
RESISTANCE WELDING SYSTEM
Filed Feb. 21, 1940　　　　　　　　　　　　2 Sheets-Sheet 1

INVENTOR.
JOHN W. DAWSON,
BY Elmer J. Gorn
ATTY.

Patented June 21, 1949

2,473,575

UNITED STATES PATENT OFFICE 2,473,575

RESISTANCE WELDING SYSTEM

John W. Dawson, Auburndale, Mass., assignor to Raytheon Manufacturing Company, Newton, Mass., a corporation of Delaware Application February 21, 1940, Serial No. 320,079

25 Claims. (Cl. 219—4)

This invention relates to resistance welding systems. In systems of this kind it is often desirable to supply for each welding operation a pulse of current which rises rapidly to a high value, continues substantially at this high value, and then falls to zero.

An object of this invention is to supply the initial rise of welding current from energy previously stored in an energy storage means, such as a condenser, and to supply the rest of the current pulse from a separate source of current, such as an alternating current line.

Another object is to devise such a system in which the peak currents drawn from the alternating current line are reduced over those which would occur during straight alternating current welding.

A further object is to devise such a system which operates reliably and with high efficiency.

A still further object is to provide for flexibility and ease of control and operation of such a system.

The foregoing and other objects of this invention will be best understood from the following description of exemplifications thereof, reference being had to the accompanying drawings, wherein.

Figure 1:
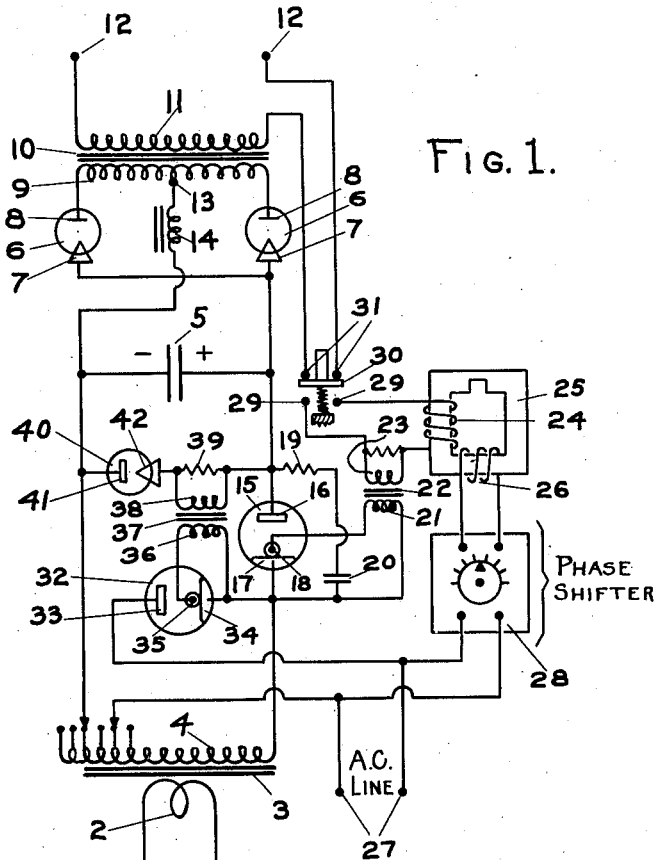
Fig. 1 is a diagram of a resistance welding system embodying my invention.

In Fig. 1 welding current is to be supplied to a welding load 1 from a secondary winding 2 of a welding transformer 3 having a primary winding 4. This primary winding is adapted to be supplied with the initial pulse of energy from a condenser 5 which is adapted to be charged from any suitable source of direct current, such as a direct current generator, battery, rectifier or the like. In Fig. 1 the direct current is shown as being supplied from a pair of rectifier tubes 6. These tubes may be of the gas or vapor-filled type with permanently-energized cathodes 7, such as thermionic filaments. The tubes 6 are also each provided with an anode 8. The anodes 8 are connected to opposite sides of the secondary winding 9 of a charging transformer 10 whose primary winding 11 is adapted to be connected at the terminals 12 of a suitable source of alternating current. The secondary winding 9 is provided with a center tap 13 connected through an impedance, such as a resistance 14, to the negative side of the condenser 5. The cathodes 7 are connected together to the positive side of the condenser 5.

The condenser 5 is adapted to be discharged through the primary winding 4, and for this purpose the negative side of said condenser is connected directly to the left side of the primary winding 4, while the positive side of said condenser is connected through a controlled ignition discharge tube 15 to the right side of said primary winding. The tube 15 is preferably of the pool cathode type with an igniter for the initiating a cathode spot on the pool in order to conduct current. Although any suitable type of igniter may be used, it preferably is of the electrostatic type consisting of a conductor insulated and separated from the cathode pool by a thin glass layer. The tube 15 is provided with an anode 16 connected directly to the positive side of the condenser 5. Said tube is also provided with a pool type cathode 17, preferably of mercury, connected to the right end of the primary winding 4. Associated with the cathode 17 is an igniter 18 preferably of the type as described above. In order to insure reliable starting of the discharge through the tube 15, a resistance 19 is connected in series with a condenser 20 across said tube 15. The igniter 18 is adapted to be supplied with igniting impulses from the secondary winding 21 of an igniting transformer 22 having a primary winding 23. The primary winding 23 is adapted to be supplied with voltage pulses from the secondary winding 24 of a peaking transformer 25 having a primary winding 26. The primary winding 26 is adapted to be energized from terminals 27 which are adapted to be connected to a suitable source of alternating current. Interposed in the connection between the terminals 27 and the primary winding 26 is a phase-shifting device 28 which preferably is adjustable so that the phase of the voltage supplied to the primary winding 26 with respect to the alternating voltage at the terminals 27 may be adjusted at will. In this way the time of the occurrence of the voltage peaks across the secondary winding 24 can likewise be adjusted. Interposed in the connection between the windings 23 and 24 is a pair of normally open contacts 29. These contacts are adapted to be closed by a pushbutton switch 30. Interposed in the connection between one of the terminals 12 and the primary winding 11 is a pair of normally closed contacts 31. The contacts 31 are back contacts on the pushbutton 30 so that, in the normal position of said pushbutton, the contacts 31 are closed.

When the pushbutton 30 is in the position as indicated in Fig. 1, direct current is supplied through the tubes 6 and the inductance 14 to the condenser 5, which therefore charges up to a predetermined voltage. When the pushbutton 30 is depressed, the primary winding 23 is supplied with voltage peaks from the secondary winding 24 whose phase position with respect to the alternating voltage at the terminals 27 is determined and adjustable by the phase-shifting device 28. At the positive peak voltage following the depression of the pushbutton 30, an igniting impulse is supplied to the igniter 18, and thereupon tube 15 starts to conduct current. This causes the condenser 5 to discharge through the tube 15 into the primary winding 4 to give the desired initial sharp rise of current which feeds energy through the transformer 3 into the resistance welding load 1.

In order to supply current from the alternating current terminals 27 at the proper time, one of the terminals 27 is connected directly to the left side of the primary winding 4, and the other terminal 27 is adapted to be connected through a controlled ignition discharge tube 32 to the other side of said primary winding. The tube 32 is preferably of the same type as that described in connection with tube 15. Tube 32 is provided with an anode 33 which is connected to the right-hand terminal 27, and with a pool cathode 34 to the right-hand side of the primary winding 4. Associated with the cathode 34 is an igniter 35, preferably of the same type as igniter 18. Igniter 35 is supplied with igniter impulses from the secondary winding 36 of an igniting transformer 37 whose primary winding 38 is connected across a resistance 39. The resistance 39 is connected in series with a rectifier tube 40 across the condenser 5. The rectifier tube 40 may be of small current-carrying capacity, but is one which can satisfactorily withstand the negative voltage applied to the condenser 5. The rectifier tube 40 is provided with an anode 41 connected to the negative side of the condenser 5, and with a permanently-energized type of cathode 42 connected in series with the resistance 39 to the positive side of said condenser. Cathode 42 may conveniently be a thermionic filament. Due to the polarity of the connections as described above, the tube 40 ordinarily does not conduct current when the condenser 5 is charged to the polarity as indicated by the direct current source.

In order to provide adjustment of the current wave, as will be described below, the points of connection of the condenser 5 and the terminals 27 to the left side of the primary winding 4 may be varied by the tapped arrangement shown.

Figure 2:
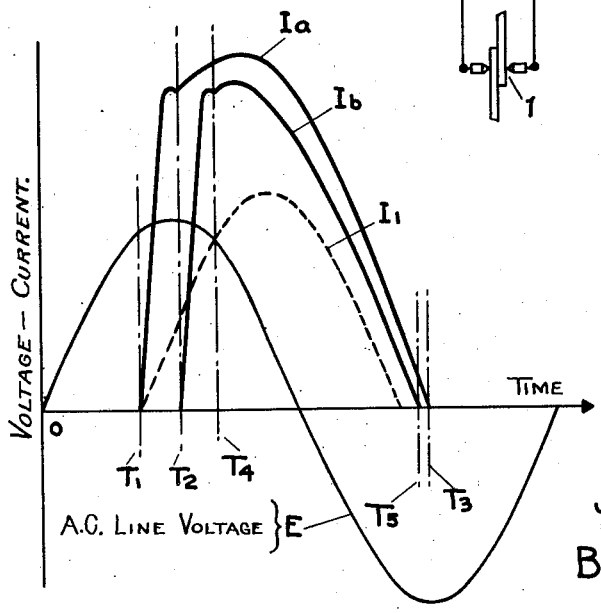
Fig. 2 is a set of curves illustrating certain aspects of the operation of my invention.

The operation of the system described above may be better understood by referring to the curves shown in Fig. 2. The curve E represents the alternating current voltage which appears at the terminals 27. The dotted curve $I_1$ represents the steady state of alternating current which would be supplied to the transformer 4 in ordinary alternating current welding in which the load 1 is connected directly to the terminals 27 for a number of cycles. The curves $I_a$ and $I_b$ represent the current which is supplied to the primary winding 4 by the system illustrated in Fig. 1 for two positions of adjustment of the phase-shifting device 28.

With the phase-shifting device 28 set in one position, the pushbutton switch 30 is depressed some time before $T_1$. At $T_1$ a voltage impulse of the proper polarity appears across the secondary winding 24 which transferred through the transformer 22 causes the tube 15 to fire. The condenser 5 thereupon discharges and supplies the sharply rising part of the current $I_a$ between the times $T_1$ and $T_2$. During this time the voltage across the condenser 5 drops to zero. At the time $T_2$, said voltage tends to reverse. This reversal of voltage causes the tube 40 to conduct and supply a pulse of current through the resistance 39. This creates a corresponding voltage impulse which transferred through the transformer 37 to the igniter 35 fires the tube 32. When the tube 32 starts to conduct current, the tube 15 is extinguished, and current from the terminals 27 flows through the tube 32 to supply the rest of the current $I_a$ from $T_2$ to $T_3$. At the time $T_3$, the current $I_a$ tends to reverse. However, due to the rectifying action of the tube 32, such reversal cannot occur, and therefore the tube 32 is extinguished and the current $I_a$ terminates. A current corresponding to $I_a$ appears in the secondary winding 2, and is supplied to the welding load 1. If the pushbutton 30 is kept depressed, the voltage impulses continue to be supplied to the igniter 18. Due to the opening of the back contacts 31, however, the condenser 5 does not recharge after its discharge, and therefore the voltage across it remains substantially zero. Therefore, even if an igniting impulse is supplied to the igniter 18, the tube 15 does not start inasmuch as there is no charge on the condenser 5 to discharge through said tube. When the pushbutton switch 30 is released, the back contacts 31 are reclosed, and thereupon the recharging of the condenser 5 from the rectifiers 6 occurs. Due to the above arrangement, only one welding operation occurs for each depression of the pushbutton switch 30.

The ratio of condenser voltage to line voltage determines the characteristic of the current $I_a$ after the time $T_2$. By increasing the value of the A. C. voltage, $I_a$ will rise to a higher peak value, while if said A. C. voltage is decreased, the peak value of $I_a$ will be decreased.

If the phase-shifting device 28 is adjusted so as to give an igniting impulse to the igniter 18 at a later time $T_2$, the operation of the system is the same as that described above, but a current $I_b$ flows which starts at the later time $T_2$ and ends at an earlier time $T_5$. The transition from condenser discharge current to current from the alternating current line occurs at the time $T_4$. It will be seen from Fig. 2 that the current $I_b$ does not rise to as high a value as $I_a$, and lasts for a shorter period of time. Therefore adjustment of the phase-shifting device 28 affords a convenient and flexible means whereby the power which is supplied to the resistance welding load 1 may be readily adjusted.

Since the discharge circuit of condenser 5 is independent of any variations in the A. C. voltage at terminals 27, the peak values of the initital sharp rise of current are independent of the A. C. line voltage at the terminals 27. Thus, for example, the values of $I_a$ at $T_2$ and $I_b$ at $T_4$ are substantially equal. This makes the welds more uniform in the face of any variations in the alternating voltage at the terminals 27.

The curves in Fig. 2 represent generally the relative magnitudes of the currents $I_1$, $I_a$ and $I_b$. When we compare the magnitudes of these currents, we see that, for a given alternating voltage at the terminals 27, a much larger current can be supplied to a particular resistance welding load with a system operating in accordance with the present invention than with a system utilizing straight alternating current welding. This means that for a required amount of power, smaller current surges are drawn from the alternating line by the present invention. Also the wave shape of the current supplied to the welding load is under control and can be made to rise as sharply as desired by properly selecting the constants of the condenser 5 and its associated discharge circuit. Various ways of controlling the shape of the welding current wave, as by varying the turns of the primary into which the condenser 5 and the alternating current line respectively feed, can be utilized. The improved operation of my system results, at least partly, from the fact that the condenser 5 supplies substantially all of the energy represented by the magnetic flux produced on the load circuit, and the alternating current line connected to the terminals 27 supplies substantially only power to the resistance components of the load circuit.

Figure 3:
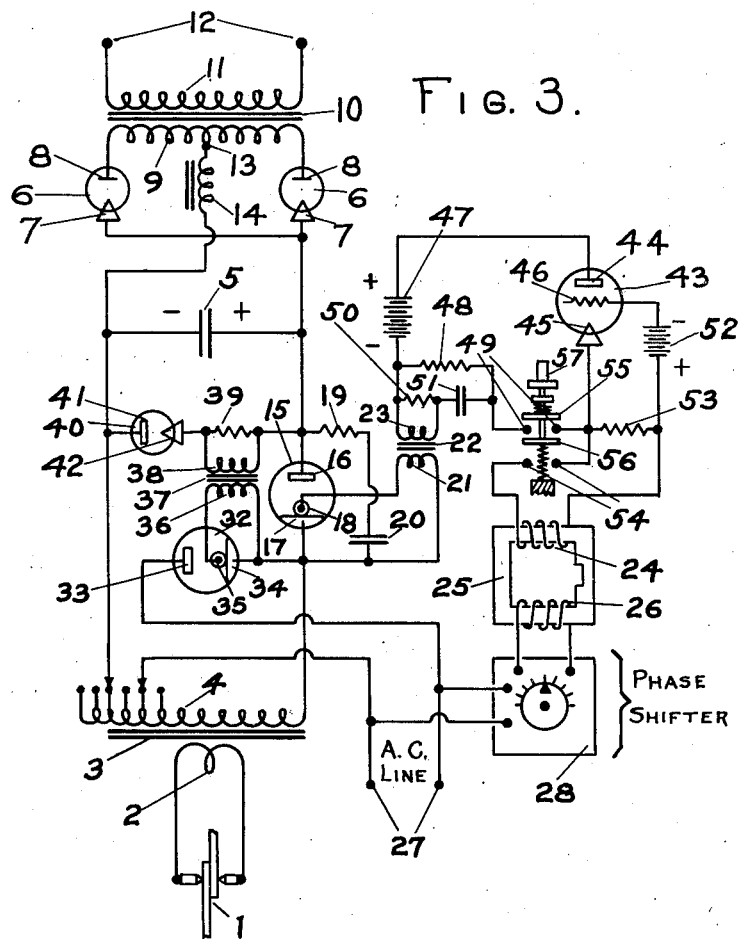
Fig. 3 is a diagram of another embodiment of my invention.

Instead of opening the charging circuit to the condenser 5 to insure a single welding operation for each depression of the operating switch, a system for supplying but one igniting impulse to the tube 15 for each actuation of said switch can be used as illustrated, for example, in the modification shown in Fig. 3. In this figure the same reference numerals are applied where elements are identical with those shown in Fig. 1. In Fig. 3, instead of the secondary winding 24 supplying its voltage impulses directly to the primary winding 23, said voltage impulses are utilized to fire a grid-controlled valve tube 43. This tube may be of the gas or vapor-filled type in which the initiation of the discharge is controlled by an electrostatic grid, but in which, upon the occurrence of such a discharge, the voltage on the grid thereafter has substantially no effect on the continuation of said discharge.

The tube 43 is provided with an anode 44, a cathode 45 of the permanently-energized type, such as a thermionic filament, and a control grid 46. The anode 44 is connected through a source of direct current, such as a battery 47, a resistance 48, and a pair of normally open contacts 49 to the cathode 45. Across the resistance 48 is connected a resistance 50 in series with the condenser 51. The primary winding 23 of the igniting transformer 22 is connected across the resistance 51. The grid 46 is connected through a biasing potential source, such as a battery 52 and a resistance 53, to the cathode 45. The battery 52 is of such a polarity as to impart a negative bias to the grid 46, so that, in absence of additional voltages supplied to said grid, the tube 43 is maintained in a non-conducting condition. The secondary winding 24 is connected across the resistance 53 through a normally open pair of contacts 54. The contacts 49 and 54 are adapted to be closed by armatures 55 and 56, respectively, of a pushbutton switch 57. These armatures are preferably so arranged that, upon depression of the switch 57, the armature 55 first closes the contacts 49, and thereafter the armature 56 closes the contacts 54.

When the pushbutton switch 57 is depressed, the contacts 49 are closed, completing the anode-cathode circuit of the tube 43. However, this tube does not start to conduct current because of the negative bias on the grid 46. Thereupon the armature 56 closes the contacts 54. Upon the following voltage impulse of proper polarity supplied from the secondary winding 24, said voltage impulse overcomes the negative bias of the battery 52, and therefore the grid 46 permits a discharge to be initiated between the anode 44 and the cathode 45. The resultant flow of current creates a voltage impulse across the resistance 48, which voltage impulse is impressed on the primary winding 23 through the resistance 50. The condenser 51 is provided for the purpose of keeping direct current from flowing through said primary winding 23. The voltage impulse thus supplied to said primary winding causes an igniting impulse to be supplied to the igniter 18 which fires the tube 15. Thereafter the operation is identical with that as explained above in connection with Fig. 1. Since a discharge once started in the tube 43 is not extinguished until the armature 55 opens the contacts 49, no additional igniting impulses are supplied to the igniter 18 as long as the pushbutton switch 57 is kept depressed, and thus only one welding operation occurs for each depression of said switch. When the pushbutton switch 57 is released, the contacts 49 are opened and the discharge through the tube 43 is extinguished, thus reconditioning the system for the next operation.

Of course it is to be understood that this invention is not limited to the particular details as described above as many equivalents will suggest themselves to those skilled in the art. For example, other sources of power than the alternating current line connected to the terminals 27 could be utilized to feed power into the resistance welding load after the initial discharge of the condenser 5. The source preferably should be one which can supply whatever power is demanded without substantially affecting the voltage of said source. Such sources of power might include, for example, a direct current source. In some instances other types of energy storage devices than a condenser could be utilized to supply the initial sharp rise of current in the resistance welding load. Other types of circuit-controlling or circuit-closing arrangements could be utilized instead of the particular tubes shown herein. Other modifications and ideas as to the utilization of the principles enunciated herein will suggest themselves to those skilled in the art. It is accordingly desired that the appended claims be given a broad interpretation commensurate with the scope of the invention within this art.

What is claimed is:

1. A welding system comprising an electrical energy storage device, means for supplying storage energy to said storage device, a welding load, means for discharging the energy stored in said storage device into said load, a source of power capable of supplying energy to said load without substantial effect on the voltage of said source, and means for connecting said source to said load upon substantial discharge of said storage device.

2. A welding system comprising a condenser, means for charging said condenser, a welding load, means for discharging said condenser into said load, a source of power capable of supplying energy to said load without substantial effect on the voltage of said source, and means for connecting said source to said load upon substantial discharge of said condenser.

3. A welding system comprising a condenser, means for charging said condenser, a welding load, means for discharging said condenser into said load, an alternating current source, and means for connecting said source to said load upon substantial discharge of said condenser.

4. A welding system comprising a condenser, means for charging said condenser, a welding load, an alternating current source, circuit-closing means for connecting said condenser to said load to discharge said condenser into said load, means for operating said circuit-closing means at a predetermined point on the voltage wave of said source, and means for connecting said source to said load upon substantial discharge of said condenser.

5. A welding system comprising a condenser, means for charging said condenser, a welding load, an alternating current source, circuit-closing means for connecting said condenser to said load to discharge said condenser into said load, adjustable means for operating said circuit-closing means at any one of a plurality of predetermined points on the voltage wave of said source, and means for connecting said source to said load upon substantial discharge of said condenser.

6. A welding system comprising a condenser, means for charging said condenser, a welding load, an alternating current source, circuit-closing means for connecting said condenser to said load to discharge said condenser into said load, means for operating said circuit-closing means at a predetermined point of delayed phase on the voltage wave of said source, and means for connecting said source to said load upon substantial discharge of said condenser.

7. A welding system comprising a condenser, means for charging said condenser, a welding load, an alternating current source, a controlled ignition discharge tube for connecting said condenser to said load to discharge said condenser into said load, and means for connecting said source to said load upon substantial discharge of said condenser.

8. A welding system comprising a condenser, means for charging said condenser, a welding load, an alternating current source, a controlled ignition discharge tube for connecting said condenser to said load to discharge said condenser into said load, means for igniting said tube at a predetermined point on the voltage wave of said source, and means for connecting said source to said load upon substantial discharge of said condenser.

9. A welding system comprising a condenser, means for charging said condenser, a welding load, an alternating current source, a controlled ignition rectifying discharge tube for connecting said condenser to said load to discharge said condenser into said load, and means for connecting said source to said load upon substantial discharge of said condenser.

10. A welding system comprising a condenser, means for charging said condenser, a welding load, an alternating current source, means for discharging said condenser into said load, and a controlled ignition discharge tube for connecting said source to said load upon substantial discharge of said condenser.

11. A welding system comprising a condenser, means for charging said condenser, a welding load, an alternating current source, means for discharging said condenser into said load, and a controlled ignition rectifying discharge tube for connecting said source to said load upon substantial discharge of said condenser.

12. A welding system comprising a condenser, means for charging said condenser, a welding load, an alternating current source, a controlled ignition discharge tube for connecting said condenser to said load to discharge said condenser into said load, and a controlled ignition discharge tube for connecting said source to said load upon substantial discharge of said condenser.

13. A welding system comprising a condenser, means for charging said condenser, a welding load, an alternating current source, means for discharging said condenser into said load, means for connecting said source to said load upon substantial discharge of said condenser, means for initiating the operation of the system, and means for providing only one complete pulse of current for each actuation of said last-named means substantially independent of the duration of said actuation.

14. The method of resistance welding which comprises supplying substantially all of the energy represented by the magnetic flux produced in the welding load circuit from energy derived from an energy storage means, and supplying substantially all of the resistance power components of the welding current from a source of power capable of supplying energy to the welding load without substantial effect on the voltage of said source.

15. The method of resistance welding which comprises supplying substantially all of the energy represented by the magnetic flux produced in the welding load circuit from charged condenser means, and supplying substantially all of the resistance power components of the welding current from a source of power capable of supplying energy to the welding load without substantial effect on the voltage of said source.

16. The method of resistance welding which comprises supplying substantially all of the energy represented by the magnetic flux produced in the welding load circuit from charged condenser means, and supplying substantially all of the resistance power components of the welding current from an alternating current source.

17. The method of resistance welding which comprises supplying a controlled initial wave front of welding current to a welding load entirely from energy storage means, and connecting a source of alternating current to said load to supply additional components of power.

18. A welding system comprising an electrical energy storage device, a welding load, and an alternating current source, and means for successively discharging said energy storage device and said alternating current source into said load in such closely timed sequence as to produce a unitary welding action.

19. A resistance welder comprising a circuit including a welding transformer, a power transformer, and an energy storing device, means for storing energy from said power transformer in said device, and means for releasing surges of energy from said device through said welding transformer in timed relation with phase of voltage in said power transformer.

20. A resistance welder comprising a circuit including a welding transformer, a power transformer, an energy storing device, means for storing energy from said power transformer in said device, and means for releasing surges of energy from said device through said welding transformer in timed relation with phase of voltage in said power transformer, said last-mentioned means being uninfluenced by the charging or discharging current.

21. In combination, an alternating current supply circuit, a load circuit, electric translating apparatus for energizing said load circuit comprising a capacitance, means for charging said capacitance from said alternating current supply circuit, a transformer having a primary winding and a secondary winding connected to said load circuit, an electric valve means connected in series relation with said capacitance and said primary winding for discharging said capacitance through said primary winding, said electric valve means having a control member, an excitation circuit for supplying an energizing impulse of current to said control member to render said electric valve means conducting, a second electric valve means connected across at least a portion of said primary winding for by-passing the first mentioned electric valve means and said capacitance to limit the build-up of reverse voltage across said capacitance, means for introducing an alternating voltage in series relation with said second electric valve means, and means for synchronizing the application of said energizing impulse to said control member with respect to said alternating voltage.

22. In combination, an alternating current supply circuit, a load circuit, a capacitance, a charging circuit for said capacitance, a transformer having a primary winding and a secondary winding connected to said load circuit, an electric valve means connected in series relation with said capacitance and said primary winding for effecting discharge of said capacitance through said primary winding and for effecting energization of said load circuit, said electric valve means having a control member, an excitation circuit for energizing said control member to render said electric valve means conducting, a second electric valve means connected to shunt said electric valve means and said capacitance and being poled to permit the flow of circulating current through said primary winding to the exclusion of the first-mentioned electric valve means and said capacitance after the voltage of said capacitance has decreased to the region of the zero value upon discharge thereof, means connected in series relation with said second electric valve means for introducing in circuit therewith a component of voltage to shorten the exponential decay of current flowing through said primary winding, and means connected between said alternating current circuit and said excitation circuit for synchronizing the application of energizing voltage to said control member with respect to said voltage.

23. In combination, a supply circuit, a load circuit, electric translating apparatus for energising said load circuit comprising a capacitance, means for charging said capacitance from said supply circuit, a transformer having a primary winding and a secondary winding connected to said load circuit, an electric valve means connected in series relation with said capacitance and said primary winding for discharging said capacitance through said primary winding, said electric valve means having a control member, a control circuit for supplying an energizing impulse of current to said control member to render said electric valve means conducting, a second electric valve means connected across at least a portion of said primary winding for by-passing the first-mentioned electric valve means and said capacitance to limit the build-up of reverse voltage across said capacitance, means for introducing in series relation with said second electric valve means a control voltage to expedite the rate of decay of the primary winding current, and means for timing the application of said energizing impulse to said control member with respect to said control voltage.

24. In combination, a supply circuit, a load circuit, electric translating apparatus for energizing said load circuit comprising a capacitance, means for charging said capacitance from said supply circuit, a transformer having a primary winding and a secondary winding connected to said load circuit, an electric valve means connected in series relation with said capacitance and said primary winding for discharging said capacitance through said primary winding, said electric valve means having a control member, a control circuit for supplying an energizing impulse of current to said control member to render said electric valve means conducting, a second electric valve means connected across at least a portion of said primary winding for by-passing the first-mentioned electric valve means and said capacitance to limit the build-up of reverse voltage across said capacitance, means for introducing in series relation with said second electric valve means a control voltage to expedite the rate of decay of the primary winding current, and means for timing said control voltage with respect to the application of said energizing impulse to said control member.

25. In combination, a supply circuit, a load circuit, electric translating apparatus for energizing said load circuit comprising a capacitance, means for charging said capacitance from said supply circuit, a transformer having a primary winding and a secondary winding connected to said load circuit, an electric valve means connected in series relation with said capacitance and said primary winding for discharging said capacitance through said primary winding, said electric valve means having a control member, a control circuit for supplying an energizing impulse of current to said control member to render said electric valve means conducting, a second electric valve means connected across at least a portion of said primary winding for by-passing the first-mentioned electric valve means and said capacitance to limit the build-up of reverse voltage across said capacitance, means for introducing in series relation with said second electric valve means a voltage to expedite the rate of decay of the primary winding current, initiating means for controlling said control circuit to effect energization of said load circuit, and means controlled by said initiating means for timing the operation of said second electric valve means with respect to said voltage.

JOHN W. DAWSON.

REFERENCES CITED

The following references are of record in the file of this patent:

UNITED STATES PATENTS

| Number | Name | Date |
|---|---|---|
| 1,031,026 | Presser | July 2, 1912 |
| 1,433,853 | Sethman | Oct. 31, 1922 |
| 2,074,276 | Schmerber | Mar. 16, 1937 |
| 2,184,627 | Watson | Dec. 26, 1939 |